J. D. ARMSTEAD & S. KELLEY.
COTTON CHOPPER.
APPLICATION FILED APR. 23, 1907.

938,626.

Patented Nov. 2, 1909.

Witnesses
John K. Crawford

Inventors
J.D. Armstead
Silas Kelley
By Chandler & Chandler
Attorneys

UNITED STATES PATENT OFFICE.

JOHN D. ARMSTEAD AND SILAS KELLEY, OF JONESTOWN, MISSISSIPPI.

COTTON-CHOPPER.

938,626.     Specification of Letters Patent.     Patented Nov. 2, 1909.

Application filed April 23, 1907. Serial No. 369,794.

*To all whom it may concern:*

Be it known that we, JOHN D. ARMSTEAD and SILAS KELLEY, citizens of the United States, residing at Jonestown, in the county of Coahoma, State of Mississippi, have invented certain new and useful Improvements in Cotton-Choppers; and we do hereby declare the following to be a full, clear, and exact description of the invention, such as will enable others skilled in the art to which it appertains to make and use the same.

The invention relates to a cotton chopper and more particularly to the class of wheeled cotton choppers having a rotatable cylinder provided with chopping hoes.

The primary object of the invention is the provision of a cotton chopper in which a rotatable element supports and carries a plurality of adjustable radially disposed chopper hoes, whereby the latter may be regulated at the will of the operator so that they may be adjusted with respect to the ground.

In connection with a cotton chopper of this character, the invention aims as a further object to provide a novel construction, combination and arrangement of parts, the details of which will appear in the course of the following description, in which reference is had to the accompanying drawings forming part of this specification, like characters of reference designating similar parts throughout the several views wherein:—

Figures 1, 2:
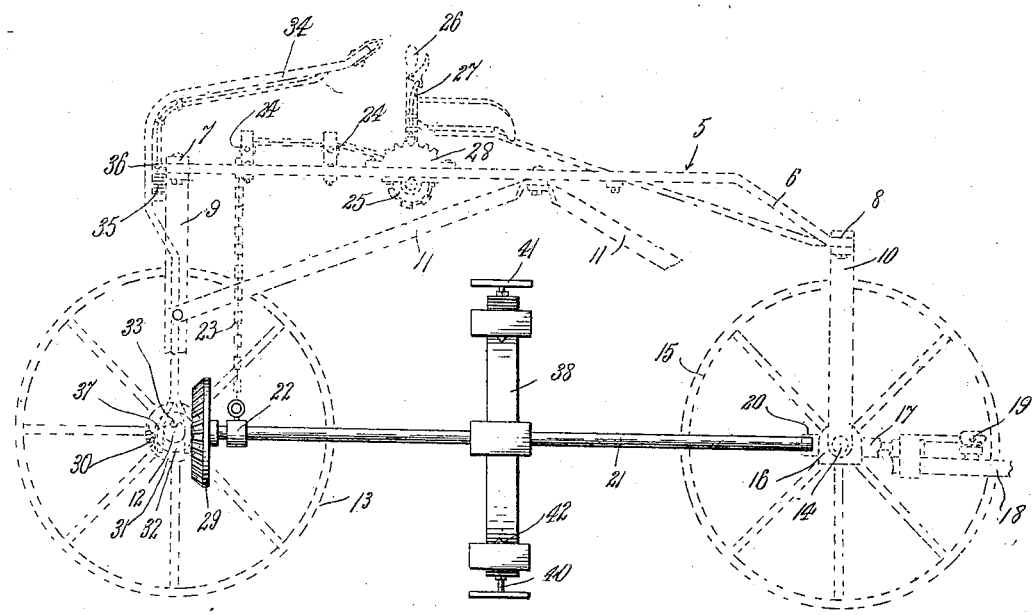
Figure 3:
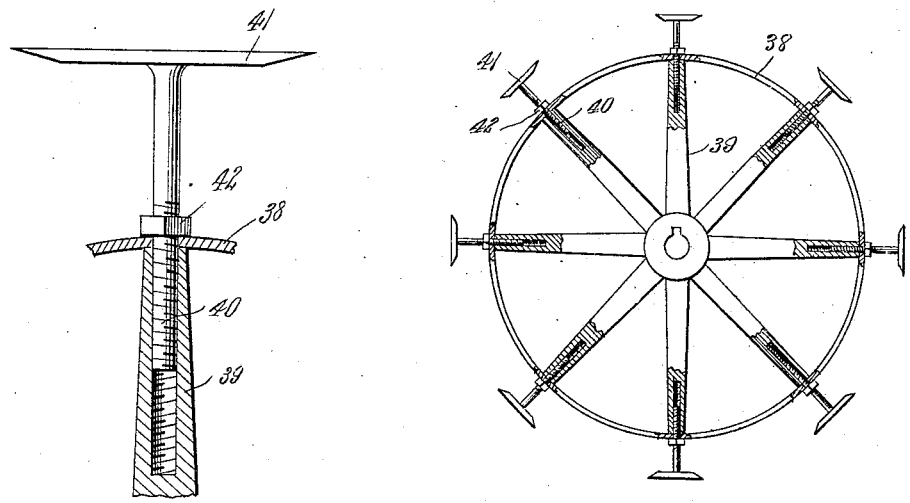

Figure 1 is a side elevation of a cotton chopper constructed in accordance with the present invention. Fig. 2 is a detail longitudinal sectional view of the revolving cylinder. Fig. 3 is a detail fragmentary sectional view showing the adjustable connection between one hoe and its standard.

Referring specifically to the accompanying drawings, the numeral 5 designates generally a rectangular frame, provided with inclined front ends 6, a rear cross bar 7, a front cross bar 8, rear hangers 9, front hangers 10, and braces 11, between said hangers and the said frame. The rear hangers 9, support a shaft 12, carrying the wheels 13 with which it rotates and the front hangers 10, support an axle 14, carrying the wheels 15. A bolster 16, is carried on the axle 14 and is provided with hounds 17, a tongue 18, and whiffletrees 19. The bolster 16 supports rearwardly thereof a pivoted bearing 20, which receives the front end of a longitudinal shaft 21, the other end of said shaft being projected through a bearing 22 suspended from a chain 23. The chain 23 is trained over pulleys 24 secured to the frame 5, and has its end secured to a reel 25 designed for partial rotation and supported from the frame 5. The movement of the reel 25 is controlled by a lever 26 secured to its shaft and having a conventional pawl 27, for engagement with the teeth of a rack sector 28.

The shaft 21 at its rear end is provided with a bevel pinion 29 which is designed to mesh with either one of similar confronting pinions 30 and 31, provided on a sleeve 32, the latter being splined on the shaft 12 and having a grooved portion 33. The slidable movement of the sleeve 32 to bring either of its pinions 30 and 31 into engagement with the pinion 29, is controlled by a lever 34 pivoted between its ends centrally of a rack sector 35, and having a conventional pawl 36 for engagement with said rack sector. The lever 34 has a forked lower end 37 which engages the grooved portion 33 of the sleeve 32, as will be readily understood. The shaft 21 carries at a point central thereof a circumscribing cylinder 38, provided with hollow standards 39, through which are received the threaded shanks 40 of hoes 41, nuts 42 being provided on said shanks to adjustably position them with relation to the standards 39. The hoes 41 have two oppositely disposed blades which are used in accordance with the direction of rotation of the cylinder 38.

By moving the lever 26 to the right or to the left as shown in Fig. 1, the shaft 21 may be correspondingly raised or lowered out of or into gear through the connections described. The direction of rotation of said shaft will depend upon which of the gears 30 or 31 is in mesh with the gear 29, the adjustment being effected by the means previously described, as will be readily understood. Upon the advancement of the machine the cylinder 38 revolves which successively brings its hoes into operation as will be readily understood.

From the foregoing description, it will be seen that simple and efficient means are provided for accomplishing the objects of the invention, but, while the elements herein shown and described are well adapted to serve the purpose set forth, it is obvious that various minor changes may be made in the proportions, shape and arrangement of the several parts without departing from the spirit and scope of the invention as defined in the appended claim.

What is claimed is:—

In a cotton chopper, a rotating chopper element comprising a hub, radially projecting spokes on said hub and having internally threaded bores for a portion of their length, an annulus supported by said spokes and having openings registering with the bores, hoes having stems adjustably mounted in the threaded bores of the spokes, jam nuts threaded on said stems and bearing against the exterior face of the annulus to maintain the latter in position and to brace the spokes and also hold the hoes in adjusted position.

In testimony whereof, we affix our signatures, in presence of two witnesses.

JOHN D. ARMSTEAD.
SILAS KELLEY.

Witnesses:
H. W. KELLEY,
ISHMAEL KELLEY.